United States Patent
Halstead et al.

(10) Patent No.: US 10,970,724 B2
(45) Date of Patent: Apr. 6, 2021

(54) GENERATING TELECOMMUNICATION NETWORK CONSTRUCTION ZONES VIA CLUSTERING ON WEIGHTED ADJACENCY GRAPHS OF DISTRIBUTION AREAS

(71) Applicant: AT&T Intellectual Property I, L.P., Atlanta, GA (US)

(72) Inventors: Susanne Halstead, San Jose, CA (US); Halim Damerdji, Los Altos, CA (US); Andrew Domenico, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 724 days.

(21) Appl. No.: 15/400,612

(22) Filed: Jan. 6, 2017

(65) Prior Publication Data
US 2018/0197188 A1 Jul. 12, 2018

(51) Int. Cl.
*G06Q 30/02* (2012.01)
*G06T 11/20* (2006.01)
*H04W 16/18* (2009.01)
*H04W 84/04* (2009.01)

(52) U.S. Cl.
CPC ........ *G06Q 30/0201* (2013.01); *G06T 11/206* (2013.01); *H04W 16/18* (2013.01); *H04W 84/042* (2013.01)

(58) Field of Classification Search
CPC .. G06Q 30/0201; G06T 11/206; H04W 16/18
See application file for complete search history.

(56) References Cited

U.S. PATENT DOCUMENTS

| | | | |
|---|---|---|---|
| 6,185,193 B1 | 2/2001 | Kawakami et al. |
| 6,611,867 B1 | 8/2003 | Bowman-Amuah |
| 6,836,467 B2 | 12/2004 | Stanley |
| 7,055,107 B1 | 5/2006 | Rappaport et al. |

(Continued)

OTHER PUBLICATIONS

Graham, Stephen. "Global grids of glass: on global cities, telecommunications and planetary urban networks." Urban Studies 36.5/6 (1999): 929. http://www.academia.edu/download/30890965/10.1.1.29.3407.pdf.

(Continued)

*Primary Examiner* — Sujay Koneru
*Assistant Examiner* — Mohamed N El-Bathy

(57) ABSTRACT

In one example, a processor may generate a graph of vertices representing distribution areas of a telecommunication network and links between vertices of adjacent distribution areas, calculate similarity measures for the links based on distance scores between vertices joined by the links relating to: percentages of aerial infrastructure and percentages of multi-unit buildings in distribution areas represented by the two vertices, and whether or not the distribution areas represented by the two vertices are on a same route from a central office of the telecommunication network. The processor may label the links with the similarity measures to create a link-weighted adjacency graph, perform community detection on the link-weighted adjacency graph to generate sub-graphs, each sub-graph including at least one of the vertices, and provide a map of construction zones based upon geographic areas covered by distribution areas associated with vertices in the sub-graphs.

19 Claims, 7 Drawing Sheets

(56) References Cited

U.S. PATENT DOCUMENTS

| | | | |
|---|---|---|---|
| 7,096,173 | B1 | 8/2006 | Rappaport et al. |
| 7,116,988 | B2 | 10/2006 | Dietrich et al. |
| 7,243,054 | B2 | 7/2007 | Rappaport et al. |
| 7,672,271 | B2 | 3/2010 | Lee |
| 7,916,690 | B2 | 3/2011 | Doshi et al. |
| 7,933,605 | B2 | 4/2011 | Rappaport et al. |
| 8,045,577 | B2 | 10/2011 | Sung et al. |
| 8,078,181 | B2 | 12/2011 | Annunziato et al. |
| 8,185,122 | B2 | 5/2012 | Guill, Jr. |
| 8,380,123 | B2 | 2/2013 | Jang |
| 8,457,644 | B2 | 6/2013 | Schmidt et al. |
| 8,718,541 | B2 | 5/2014 | Li et al. |
| 8,862,432 | B2 | 10/2014 | Herzig et al. |
| 8,929,931 | B1 | 1/2015 | Goldberg et al. |
| 9,008,670 | B2 | 4/2015 | Goldberg et al. |
| 9,124,483 | B2 | 9/2015 | Peterson |
| 9,245,241 | B2 | 1/2016 | Kite et al. |
| 10,206,110 | B1* | 2/2019 | Shavell ............... H04W 12/08 |
| 2002/0035460 | A1 | 3/2002 | Hales |
| 2006/0019679 | A1 | 1/2006 | Rappaport et al. |
| 2010/0063973 | A1* | 3/2010 | Cao ................... G06F 16/9024 707/758 |
| 2010/0325604 | A1 | 12/2010 | Jones et al. |
| 2014/0170986 | A1 | 6/2014 | Blaunshtein et al. |
| 2015/0215791 | A1 | 7/2015 | Geller et al. |
| 2015/0271280 | A1* | 9/2015 | Zhang ................... H04L 41/145 709/224 |
| 2015/0341502 | A1 | 11/2015 | Udeshi et al. |

OTHER PUBLICATIONS

Coutard, Olivier. "'Premium Network Spaces': A Comment." International journal of urban and regional research 26.1 (2002): 166-174. https://www.researchgate.net/profile/Olivier_Coutard/publication/4761236_'Premium_Network_Spaces'_A_Comment/links/56dc864a08aebabdb414250e.pdf.

Ungerer, Frank Wolfgang. "A systems approach to conceptual design solutions for a very tall building in Hong Kong." Diss. Massachusetts Institute of Technology, 1998. http://dspace.mit.edu/bitstream/handle/1721.1/70302/39171375-MIT.pdf?sequence=2Ungerer.

Foth, Marcus, Laura Forlano, and Hiromitsu Hattori. "Digital cities 6: concepts, methods and systems of urban informatics (Workshop)." (2009). http://eprints.qut.edu.au/18338/1/c18338a.pdf.

Liu, Jialu. "Large-Scale Spectral clustering on Graphs." Dated 2013. pp. 1-7.

* cited by examiner

| geo id | region | state | clli | clli8 | route | geometry |
|---|---|---|---|---|---|---|
| 001 | WEST | CA | AGTNCA11 | AGTNCA11220302 | 1 | 010100002004000000000000000 |
| 002 | WEST | CA | AGTNCA11 | AGTNCA1122892 | 1 | 010100002004000000000000000 |
| 003 | WEST | CA | AGTNCA11 | AGTNCA110303 | 2 | 010100002004000000000000000 |
| 004 | WEST | CA | AGTNCA11 | AGTNCA110410 | 3 | 010100002004000000000000000 |
| 005 | WEST | CA | AGTNCA11 | AGTNCA110417 | 4 | 010100002004000000000000000 |

410:
```
CREATE TABLE clli8_collect AS
SELECT clli8_field, state_field,
ST_Multi(ST_Collect(f.geom)) as singlegeom
FROM (SELECT clli8_field, state_field, (ST_Dump(geom)).geom As geom
FROM
geography_shapes ) As f
GROUP BY clli8_field, state_field;
```

420:
```
CREATE TABLE closed_polygons AS
select clli8_field, state_field, ST_SimplifyPreserveTopology(ST_BUFFER(singlegeom,0),0.000001) as singlegeom from clli8_collect;

CREATE INDEX ind_closed_polygons ON clli8_collect USING GIST (singlegeom);
CREATE INDEX ind_closed_polygons_clli ON clli8_collect (clli8_field);
CREATE INDEX ind_closed_polygons_state ON clli8_collect (state_field);
```

430:
```
copy(
select distinct(a.state_field, a.clli8_field , b.state_field, b.clli8_field)
from closed_polygons as a
join closed_polygons as b
on (ST_Touches(a.singlegeom, b.singlegeom) or ST_OVERLAPS(a.singlegeom, b.singlegeom) )
where a.state_field = b.state_field
)
to '~/file_location.csv' with CSV;
```

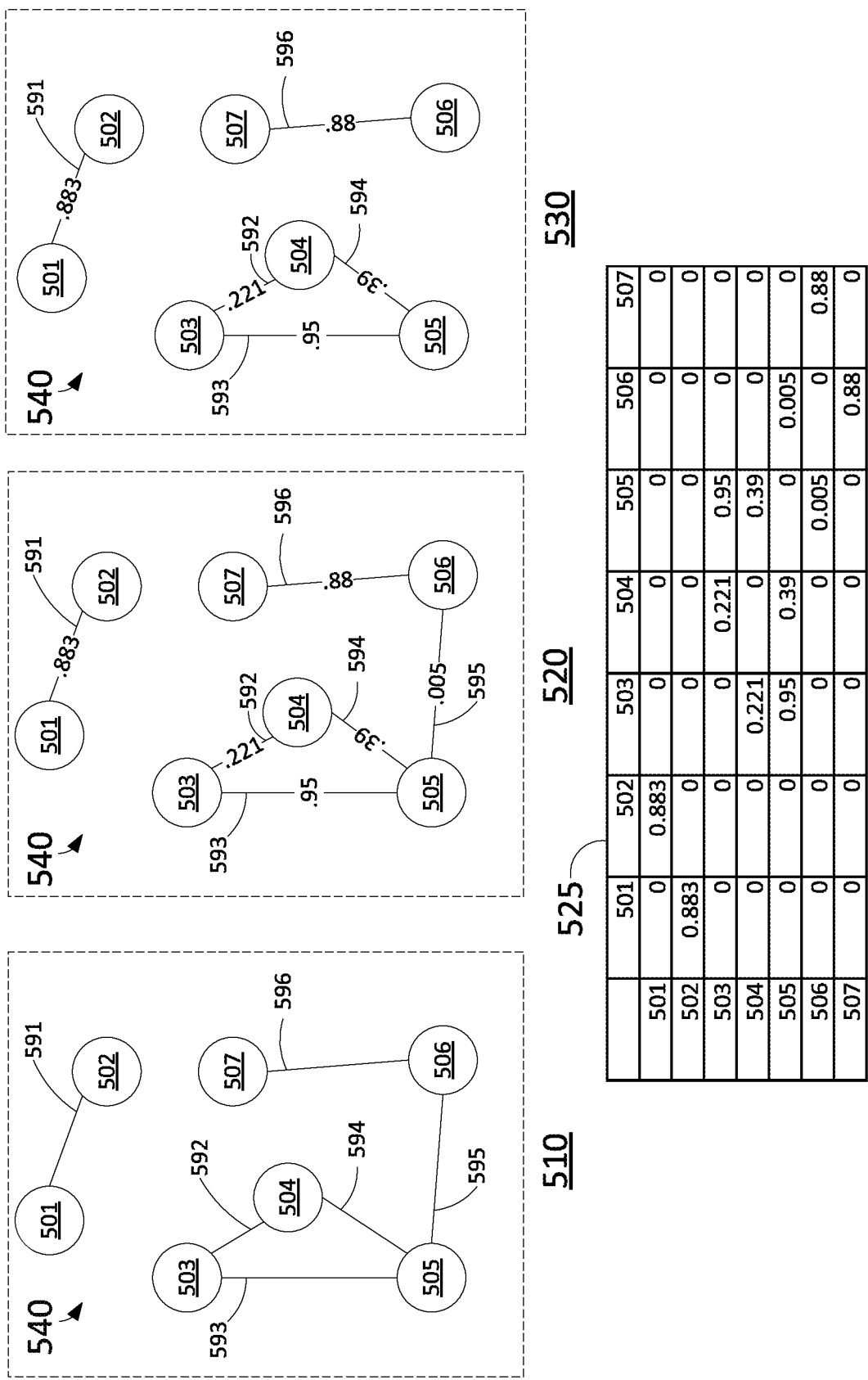

GENERATING TELECOMMUNICATION NETWORK CONSTRUCTION ZONES VIA CLUSTERING ON WEIGHTED ADJACENCY GRAPHS OF DISTRIBUTION AREAS

The present disclosure relates generally to network build-out and marketing planning for a telecommunication network, and more particularly to aggregating distribution areas into construction zones and marketing zones based upon link-weighted adjacency graphs of the distribution areas.

BACKGROUND

A Common Language Location Identifier (CLLI) code is a telecommunications industry standard and is an alphanumeric code of currently up to 11 characters. CLLI was developed to identify physical locations and equipment such as buildings, central offices, poles, and antennas. CLLI8 (an eight character CLLI alphanumeric code) is often used to refer to a wire center and/or a portion of a network serviced by a wire center, or central office (CO). In one example, customer lines are joined to nodes, e.g., in a neighborhood, and trunks may connect the nodes to central offices. In many cases, there are four large trunks comprising fiber optic cable emerging from central offices in the directions of north, south, east, and west. However, other examples may have more or less trunks, be deployed in different directions, and so forth. These trunks may also be referred to as routes.

SUMMARY

In one example, the present disclosure provides a device, method, and computer-readable medium for generating construction zones based upon a link-weighted adjacency graph of distribution areas of a telecommunication network. For example, a processor may generate a graph of a plurality of vertices and a plurality of links between the plurality of vertices. The plurality of vertices may represent distribution areas of a telecommunication network and the plurality of links may be included between vertices of distribution areas that are adjacent. The processor may then calculate a plurality of similarity measures for the plurality of links. In one example, each similarity measure of the plurality of similarity measures may be based upon a plurality of distance scores between two vertices of the plurality of vertices joined by one of the plurality of links. In addition, each distance score may relate to one of a plurality of factors, comprising: percentages of aerial infrastructure of distribution areas represented by the two vertices, percentages of multi-unit buildings in the distribution areas represented by the two vertices, and whether or not the distribution areas represented by the two vertices are on a same route from a central office of the telecommunication network. The processor may further label the plurality of links with the plurality of similarity measures to create a link-weighted adjacency graph and perform a community detection on the link-weighted adjacency graph to generate a plurality of sub-graphs. In one example, each of the plurality of sub-graphs includes at least one of the plurality of vertices. The processor may then provide a map of construction zones based upon geographic areas covered by at least one distribution area of the plurality of distribution areas that is associated with the at least one of the plurality of vertices in each of the plurality of sub-graphs.

BRIEF DESCRIPTION OF THE DRAWINGS

The present disclosure can be readily understood by considering the following detailed description in conjunction with the accompanying drawings, in which:

FIG. 3 illustrates a portion of an example shapefile representing a portion of a wire center/CLLI8 area, in accordance with the present disclosure;

FIG. 4 illustrates an example program for generating a list of adjacent vertices from a shapefile, in accordance with the present disclosure;

FIG. 5 illustrates blocks of an example process for generating sub-graphs from a graph in accordance with the present disclosure;

To facilitate understanding, identical reference numerals have been used, where possible, to designate identical elements that are common to the figures.

DETAILED DESCRIPTION

Figure 1:
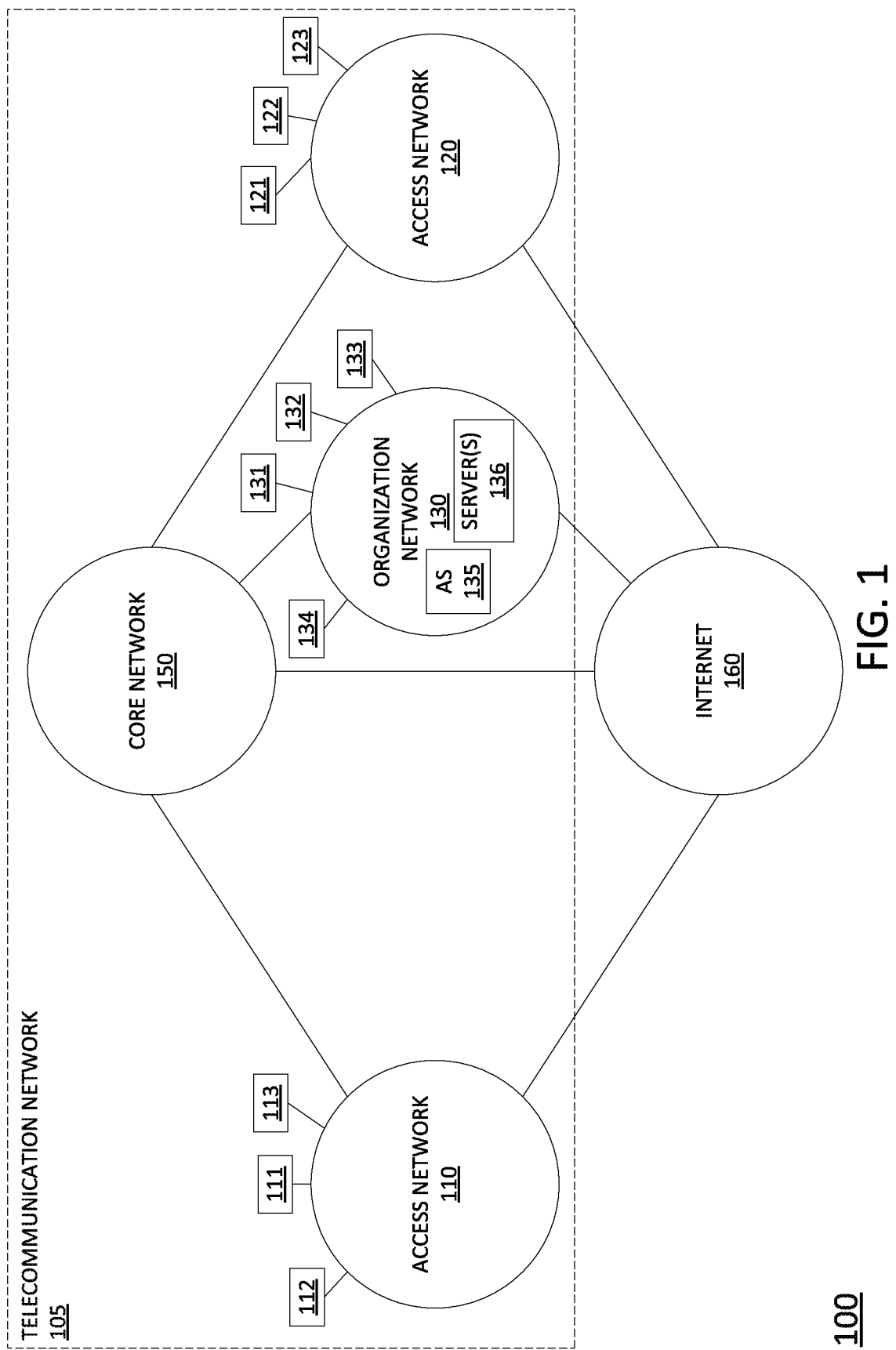
FIG. 1 illustrates one example of a system including a telecommunication network, according to the present disclosure.

The present disclosure broadly discloses devices, non-transitory (i.e., tangible or physical) computer-readable media, and methods for generating construction zones based upon a link-weighted adjacency graph of distribution areas of a telecommunication network. For instance, examples of the present disclosure create construction zones, e.g., for deployment of new fiber-to-the-premises (FTTP) links, based upon aggregations of distribution areas (DAs) using community detection, such as spectral clustering, on weighted adjacency graphs. A distribution area is a smallest cluster of living units (LUs) that are served from same network cabinet (e.g., an access box on the curb), and may include up to 100-200 living units. In one example, a source geodatabase of distribution areas (DAs) is utilized. The geodatabase may include polygons of various distribution areas (DAs). In one example, an adjacency graph or matrix is built from the set of DA polygons. For instance, vertices comprise DAs, and edges/links between vertices are included where DA polygons may be geographically adjacent. The geodatabase may also include network topology information, e.g., information as to which distribution center/wire center each DA belongs to.

In one example, the edges/links between the vertices are labeled with a "similarity measure." In accordance with the present disclosure, in one example the similarity measure is a weighted sum that is based upon three factors: percentages of aerial footage, percentages of multi-dwelling units, and whether the DAs are on the same "route." In one example, weights are applied to each of the three factors, where each of the weights ranges from 0 to 1, and where collectively the weights sum to 1. In general, the similarity measure may quantify a similarity between adjacent DAs. For instance, DAs share a similarity where both are associated with aerial infrastructure (e.g., new fiber to be deployed via utility poles). Other DAs share a similarity where both are associated with underground infrastructure, e.g., where there are already existing conduits, such as between manholes. Other DAs may be similar where both are predominantly for buried fiber (e.g., with little aerial cabling). In particular, the cost of deploying new buried fiber may be significantly more than deployed new fiber via existing utility poles or via existing underground conduits. In addition, the expertise of the construction personnel and the time required per living unit is different in the respective cases. In addition, DAs may be similar where both include similar percentages of multi-unit dwellings as compared to single family homes or businesses, and vice versa. Lastly, for a wire center, there are different distribution "routes" starting at the wire center (and/or central office). It is preferred that DAs assigned to the same construction zone are on the same route. It is easier for a construction crew to work around the same route, which may comprise a same trunk fiber, than to go back and forth between routes (e.g., different trunk fibers). In addition, when capacity is extended on the edges of the network, capacity may have to be added upstream. When working on the same route, only one path in the network may need to be extended. Therefore, whether the adjacent DAs are on the same route is utilized as a factor in determining the distance score between the adjacent DAs. In one example, to enable these types of determinations the geodatabase also includes information as to the wire center and route serving each DA.

Once a weighted graph of vertices and edges/links is generated, a community detection algorithm, e.g., a spectral clustering algorithm, is then applied which results in sub-graphs within the graph having a high degree of coherence among DAs assigned to a same sub-graph. However, some sub-graphs may be too large or too small following community detection. In particular, in examples of the present disclosure, a construction zone is subject to several illustrative constraints: a construction zone should have between 8,000 and 10,000 living units (LUs), distribution areas (DAs) in the construction zone must be adjacent, and a zone may not span a wire center boundary. Therefore, in one example sub-graphs are recursively broken up or consolidated until the constraint(s) is/are met, (e.g., size of 8,000-10,000 living units). The result is a plurality of construction zones which are translated back into the DA polygons from the geodatabase to provide a geographic map of the construction zones. In one example, the construction zones may be provided to a construction planning department where a server or personnel may engage in construction scheduling based upon the construction zones and the characteristics of the construction zones (e.g., primarily aerial versus primarily buried fiber, more multi-unit dwellings versus single-family homes, and so forth).

In one example, the construction zones may be further aggregated into marketing zones following a similar process to the above. For example, a weighted graph, or matrix, may be generated with vertices representing construction zones and links/edges included where construction zones are geographically adjacent. In one example, the construction zones are selected from a same "designated marketing area" (DMA) such that marketing zones do not span more than one DMA. The links/edges may be weighted, but use different factors to calculate a similarity measure for each edge/link. For example, the factors may include similarity scores between adjacent vertices/construction zones for various household demographics, e.g., family sizes, levels of technology adoption, levels of subscription to premium services, levels of video consumption, levels of social network consumption, vehicle categories, numbers of vehicles per household, etc. In this regard, it should be noted that the household demographics are aggregated over an entire distribution area and do not include information that is identifiable as belonging to any particular customer or household. In one example, smoothed aggregate values for demographics are computed. Taking video consumption as an example, if a distribution area has too small a fraction of living units with known video consumption for the aggregate to be reliable, the aggregate may be combined with the fraction of video consumption across its englobing CLLI8. In addition, if the fraction across the CLLI8 is too small, the CLLI8 value may be combined with that of its englobing DMA.

After edge/link weighting, a community detection algorithm is again applied to generate sub-graphs. The sub-graphs may be designated as marketing zones, or may be consolidated or broken up if one or more of the sub-graphs do not meet externally imposed constraints. For example, a constraint may be that marketing zones are between 20,000-100,000 living units. The marketing zones may then be used for various purposes, such as automated marketing communications that are differentiated by marketing zone, and so forth. These and other aspects of the present disclosure are discussed in greater detail below in connection with the examples of FIGS. 1-7.

To aid in understanding the present disclosure, FIG. 1 illustrates an example system 100 comprising a plurality of different networks for supporting the generating of construction zones based upon a link-weighted adjacency graph of distribution areas of a telecommunication network, in accordance with the present disclosure. Telecommunication network 105 may comprise a core network 150 with components for telephone services, Internet services, and/or television services (e.g., triple-play services, etc.) that are provided to customers (broadly "subscribers"), and to peer networks. In one example, core network 150 may combine core network components of a cellular network with components of a triple-play service network. For example, core network 150 may functionally comprise a fixed mobile convergence (FMC) network, e.g., an IP Multimedia Subsystem (IMS) network. In addition, core network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 150 may also further comprise a broadcast television network, e.g., a traditional cable provider network or an Internet Protocol Television (IPTV) network, as well as an Internet Service Provider (ISP) network. With respect to television service provider functions, core network 150 may include one or more television servers for the delivery of television content, e.g., a broadcast server, a cable head-end, a video-on-demand (VoD) server, and so forth. For example, core network 150 may comprise a video super hub office, a video hub office and/or a service office/central office. For ease of illustration, various components of core network 150 are omitted from FIG. 1.

In one example, access networks 110 and 120 may each comprise a Digital Subscriber Line (DSL) network, a broadband cable access network, or the like. For example, access networks 110 and 120 may transmit and receive communications between endpoint devices 111-113, 121-123, and core network 150 relating to voice telephone calls, communications with web servers via the Internet 160, organization network 130, and so forth. Access networks 110 and 120 may also transmit and receive communications between endpoint devices 111-113, 121-123 and other networks and devices via Internet 160. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In some examples, endpoint devices 111-113 and 121-123 may connect to access networks 110 and 120 via one or more intermediate devices, such as a gateway and router, an Internet Protocol private branch exchange (IPPBX), and so forth. In one example, the access networks 110 and 120 may be different types of access networks. In another example, the access networks 110 and 120 may be the same type of access network. In one example, one or more of the access networks 110 and 120 may be operated by the same service provider operating core network 150.

In one example, access networks 110 and 120 may include a plurality of distribution areas (DAs). The distribution areas may include portions of access networks 110 and 120 associated with individual nodes (e.g., fiber optic nodes and/or digital subscriber line access multiplexers (DSLAMs)) and may serve multiple living units (LUs). The living units may include single family homes and businesses, as well as multi-dwelling units (MDUs). The distribution areas may be further associated with different wire centers and/or central offices (COs) (CLLI8) of the telecommunication network 105 and/or access networks 110 and 120. Each distribution area may be a portion of the telecommunication network 105 with fiber to the node (FTTN) or fiber to the curb (FTTC) already deployed (e.g., a hybrid fiber-coaxial (HFC) access network portion), or may comprise regions of the telecommunication network 105 with electrically wired trunks/routes from central offices to nodes (e.g., a DSL access network portion, etc.). In addition, distribution areas may be associated with either overhead utility wiring (aerial) or buried utility wiring (buried). Further aspects of telecommunication network distribution areas (DAs) are described in greater detail below in connection with the examples of FIGS. 2 and 3.

In one example, an organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, core network 150, devices accessible via such other networks, such as endpoint devices 111-113 and 121-123, and so forth. In one example, endpoint devices 131-134 may each comprise a telephone for analog or digital telephony, a mobile device, a cellular smart phone, a laptop, a tablet computer, a desktop computer, a bank or cluster of such devices, and the like. In one example, the organization network 130 may be associated with the telecommunication network 105. For example, the organization may comprise the telecommunication network service provider, where endpoint devices 131-134 of the organization network 130 may comprise devices of organizational agents, such as customer service agents, marketing personnel, or other employees or representatives who are tasked with addressing customer-facing issues and/or personnel for network maintenance, network repair, construction planning, and so forth.

In one example, the system 100 may also include one or more servers 136 in the organization network 130. In one example, the servers 136 may each comprise a computing system, such as computing system 700 depicted in FIG. 7, and may be configured to host one or more centralized system components. It should be noted that in one example, a centralized system component may be hosted on a single server, while in another example, a centralized system component may be hosted on multiple servers, e.g., in a distributed manner. For example, a first centralized system component may comprise a database of customer/subscriber-assigned telephone numbers, while a second centralized system component may comprise a database of customer account data for all or a portion of the customers/subscribers of the telecommunication network 105. Other centralized system components may include a billing system, a customer relationship management (CRM) system, a trouble ticket system, an inventory system (IS), an ordering system, an enterprise reporting system (ERS), an account object (AO) database system, and so forth.

Any one or more of such centralized system components may generate, collect and/or store customer demographic information comprising, for example: a number of household members, age(s), gender(s), subscription plan(s), television viewing preferences, a service address, device type (s), such as a smartphone model, a television model, a home computer model, a set top box model, a router model, and so forth, a billing history, a payment history, purchasing and ordering information, payment methods, employment information, salary information, and so forth. The customer demographic information may be based upon a customer's interactions with the telecommunication network 105. In one example, the customer demographic information may also include information obtained by the telecommunication network 105 from third parties, such as merchants, credit card companies, credit bureaus, and the like.

In one example, servers 136 may include a geodatabase and query system, e.g., PostGIS, CartoDB, ArcGIS, or the like, which may store shapefiles representing wire centers and/or distribution areas of portions of the telecommunication network (e.g., "designated marketing areas"). In one example, the shapefiles may be converted into relational databases which can be processed in accordance with the present disclosure to generate a graph, or matrix, of vertices representing distribution areas, to weight links between vertices to generate a link-weighted graph, to generate sub-graphs from a link-weighted graph via community detection, and to generate a map of construction zones based upon the sub-graphs. In one example, maps may also be generated and/or displayed based upon the shapefiles. In one example, one of the servers 136 comprising a database and query system may further include CLLI information regarding different network equipment with various wire centers, central offices, distribution areas, etc. and/or customer demographic information. In another example, one or more of the servers 136 may store a separate database of CLLI information and/or customer demographic information which may be joined or otherwise related to information from shapefiles stored by a different one of the servers 136 comprising a geodatabase and query system.

In one example, servers 136 may also include a marketing automation platform (MAP) for sending automated communications, e.g., automated phone calls, text messages, emails, and so forth, to endpoint devices 111-113 and 121-123, as well as other customer/subscriber devices, and/or for providing instructions, communication templates, or the like to marketing personnel to communicate with endpoint devices 111-113 and 121-123, as well as other customer/subscriber devices.

In one example, organization network 130 may also include an application server (AS) 135. In one example, AS 135 may comprise a computing system, such as computing system 700 depicted in FIG. 7, and may be configured to provide one or more functions for generating construction zones based upon a link-weighted adjacency graph of distribution areas of a telecommunication network, in accordance with the present disclosure. For example, AS 135 may be configured to perform one or more steps, functions, or operations in connection with the example method 600 described below. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one example, application server 135 may generate a map of construction zones based upon information regarding distribution areas of the telecommunication network 105 obtained from one of the servers 136 comprising a geodatabase and query system. In addition, application server 135 may provide a map of construction zones generated in accordance with the present disclosure to personnel for network maintenance, network repair, construction planning, and so forth, e.g., via any one or more of endpoint devices 131-134. In one example, application server 135 may also generate a map of marketing zones, e.g., based upon the map of construction zones. In one example, the map of marketing zones may be further based upon customer demographic information which may be obtained from any one or more of servers 136. In addition, application server 135 may provide a map of marketing zones generated in accordance with examples of the present disclosure to one of servers 136 comprising a marketing automation platform. For example, application server 135 may send instructions to one of servers 136 comprising a marketing automation platform to send automated marketing communications to one or more of endpoint devices 111-113 and 121-123, or to other devices of subscribers/customers associated with endpoint devices 111-113 and 121-123, in accordance with the marketing zones. Alternatively, or in addition, application server 135 may send instructions to one or more of endpoint devices 131-134 directing marketing personnel to communicate with customers/subscribers associated with endpoint devices 111-113 and 121-123. In one example, the instructions may include a map of marketing zones generated in accordance with examples of the present disclosure and/or a listing of customers/subscribers segregated according to marketing zones. In one example, the instructions may include differentiated communications for customers/subscribers of different marketing zones.

These and other example operations for generating construction zones based upon a link-weighted adjacency graph of distribution areas of a telecommunication network are described in greater detail below in connection with the examples of FIGS. 2-6. In addition, it should be realized that the network 100 may be implemented in a different form than that illustrated in FIG. 1, or may be expanded by including additional endpoint devices, access networks, network elements, application servers, etc. without altering the scope of the present disclosure.

Figure 2:
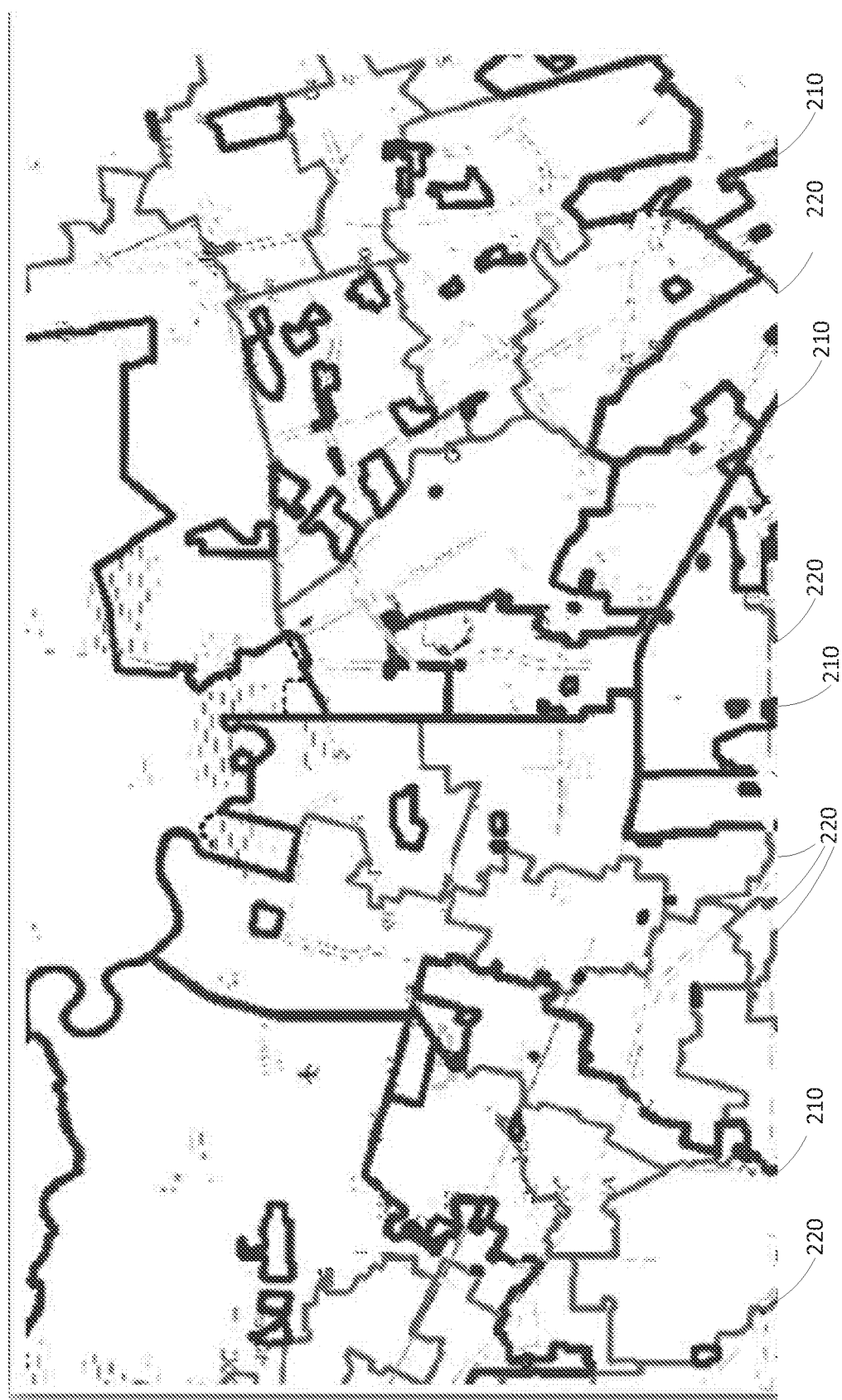
FIG. 2 illustrates an example map of polygons generated in accordance with examples of the present disclosure for generating construction zones based upon a link-weighted adjacency graph of distribution areas of a telecommunication network.

FIG. 2 illustrates a map 200 of polygons generated in accordance with examples of the present disclosure for generating construction zones based upon a link-weighted adjacency graph of distribution areas of a telecommunication network. For example, the map 200 may represent a geographic coverage area of the telecommunication network 105, e.g., within a certain metro area. In one example, the darker border lines of the map 200 (a representativee portion of which are labeled as 210 in FIG. 2) may represent boundaries of different construction zones generated in accordance with examples of the present disclosure. In one example, the lighter border lines of the map 200 (a representative portion of which are labeled as 210 in FIG. 2) may represent telecommunication network distribution areas (DAs) which are assigned to respective construction zones in accordance with examples of the present disclosure. In one example, construction zones are created subject to a constraint that each construction zone includes between 8,000 and 10,000 living units. However, in one example, the constraint may be a soft constraint that can be relaxed in certain circumstances. Thus, is some examples, a construction zone may include up to 15,000 living units, 25,000 living units, etc. or may include less than 6,000 living units, 4,000 living units, etc. It should be noted that a map and polygons representing marketing zones, and the construction zones from which the marketing zones are created may take a similar form to that which is illustrated in map 200 of FIG. 2. However, in such an example, the marketing zones may cover a larger areas, e.g., 20,000-100,000 living units.

To further aid in understanding the present disclosure, FIG. 3 illustrates a portion of a shapefile 300 representing a portion of a wire center/CLLI8 area "AGTNCA11." For instance, at least a portion of the map 200 may include areas associated with a shapefile 300. In one example, each entry (e.g., each row) in shapefile 300 relates to a telecommunication network distribution area. It should be noted that the portion of shapefile 300 illustrated in FIG. 3 includes 5 entries. However, the number of actual entries relating to the wire center may include more entries. In addition, the shapefile 300 may include numerous other entries relating to a plurality of additional wire centers, e.g., within a "designated marketing area." It should be noted that FIG. 3 illustrates shapefile 300 in the form of a table. However, it should be understood that the actual representation of such data, e.g., as stored on a computer-readable storage device, may take any number of forms. For instance, shapefile 300 as illustrated in FIG. 3 may represent a visual output in accordance with a program for accessing and manipulating geodatabases of a geodatabase storage and query system, e.g., PostGIS, or the like.

FIG. 4 illustrates an example program 400 for generating a list of adjacent vertices from a shapefile, in accordance with the present disclosure. For instance, the program 400 may be used in connection with processing the shapefile 300 of FIG. 3. In the present example, the program 400 may be associated with the PostGIS extension to PostgreSQL. However, it should be understood that similar programs may be utilized in connection with examples of the present disclosure relating to other geodatabase platforms and/or other query languages. In one example, the shapefile may first be loaded with a Shp2pgsql command line tool. In one example, code section 410 relates to collecting individual geographies into merged polygons, or "multi-polygons." In addition, it is possible that the multi-polygons may include self-intersecting polygons which require fixing. For example, invalid polygons may inhibit a UNION operation utilized to generate merged geographies. Accordingly, a next code section 420 fixes invalid polygons. The last code section 430 relates to generating and exporting a list of adjacent wire centers/CLLI8 regions. In one example, a list generated via program 400 may comprise a graph, or matrix, of vertices and edges/links between the vertices, or may be used to construct a visual graph of vertices and edges/links between the vertices representing adjacent wire centers. For example, each vertex may represent a wire center that appears in the list, while an edge/link may be included between two vertices where the list includes an entry indicating the wire centers represented by the two vertices have a geographic adjacency. It should be noted that although the example program 400 relates to generating a list of adjacent wire centers/CLLI8 regions, the same or a similar logic may be applied to generating a list of adjacent distribution area (DAs), generating a list of adjacent construction zones, and so forth.

FIG. 5 illustrates blocks of an example process 500 for generating sub-graphs from a graph in accordance with the present disclosure. In one example, the process 500 relates to a graph 540 that may be generated in accordance with a program, such as program 400 of FIG. 4, for generating a list of adjacent regions from a shapefile, e.g., a geodatabase. For instance, in one example, vertices 501-507 may represent distribution areas within a wire center of a telecommunication network. In another example, vertices may represent wire centers in a "designated marketing area" or construction zones previously generated in accordance with the present disclosure. For illustrative purposes, the process 500 is described in connection with an example for generating sub-graphs comprising candidate construction zones based upon vertices representing distribution areas.

At block 510, the graph 540 is constructed having vertices 501-507 representing distribution areas of a wire center. Links 591-596 are provided as illustrated, and represent adjacencies between distribution areas represented by respective vertices. For example, distribution areas represented by vertices 501 and 502 are adjacent, as indicated by the presence of link 591. Similarly, distribution areas represented by vertices 503 and 504 are adjacent, as indicated by the inclusion of link 592.

At block 520, the links 591-596 of the graph 540 are weighted with similarity measures. In one example, each similarity measure comprises a weighted sum of similarity scores between two vertices joined by a link. Each similarity score may relate to one of a plurality of factors, such as: percentages of aerial infrastructure of distribution areas represented by the two vertices, percentages of multi-unit buildings in the distribution areas represented by the two vertices, and whether or not the distribution areas represented by the two vertices are on a same route from a central office of the telecommunication network. For example, a similarity measure for a link between vertices representing adjacent distribution areas may be calculated in accordance with equation 1:

$$S=1-(x*A+y*B+z*C) \qquad \text{Equation 1:}$$

In equation 1, x, y, and z are weighting factors which sum to 1, and A, B, and C are distance scores. In one example, the similarity measure, S, ranges from 0 to 1. In one example, distance scores A, B, and C are also scaled from 0 to 1. For instance, distance score A may be based upon a difference in percentage of aerial infrastructure between distribution areas. For instance, if 78 percent of a distribution area represented by vertex 501 comprises overhead wiring zones (i.e., areas of aerial infrastructure) while 45 percent of a distribution area represented by vertex 502 comprises overhead wiring zones, the difference is 33 percent. Thus, a distance score relating to this factor may be 0.33. Likewise, distance score B may relate to a difference in percentages of multi-dwelling units of the respective distribution areas represented by vertices 501 and 502. For instance, the distribution area of vertex 501 may have 60 percent of all living units comprising multi-dwelling units, while the distribution area of vertex 502 may have 59 percent of all living units comprising multi-dwelling units. Thus, the difference is 1 percent or a distance score of 0.01. Lastly, the distance score C may relate to whether distribution areas represented by two vertices are on a same route (e.g., serviced via a same trunk from their central office). In one example, the distance score C may simply be a zero (0) or 1; zero if on the same route, or a 1 if not on the same route. In the present example, distribution areas represented by vertices 501 and 502 may be on the same route, thus distance score C may be 0. Returning to equation 1, if the weighting factors x, y, and z are 0.35, 0.15, and 0.5 respectively, the similarity score for link 591 between vertices 501 and 502 may be calculated as 0.883.

In one example, the graph 540 may be maintained as a matrix 525, e.g., a "similarity matrix," comprising rows and columns representing the vertices 501-507, wherein at least a portion of row-column entries in the matrix 525 represent the links 591-596. For instance, labeling the links 591-596 with the similarity measures may comprise populating each row-column entry in the matrix 525 for vertex pairs joined by one of the plurality of links with a respective similarity measure. For example, the entry of the row corresponding to vertex 503 and the column corresponding to vertex 504 is the value 0.221, i.e., the similarity measure between vertices 503 and 504 for the link 592. Similarly, the entry of the row corresponding to vertex 504 and the column corresponding to vertex 503 is also the value 0.221. In one example, row-column entries of the matrix 525 for vertices that do not share a link are set to a zero value. Conversely, row-column entries of the matrix 525 that are non-zero represent the links 591-596 and their respective similarity measures. In addition, the weighting factors described above are provided by way of example only. Thus, in another example, x, y, and z may comprise 0.4, 0.4, and 0.2, respectively. In still another example, x, y, and z may take different values, and so on.

At block 530, the graph 540 is segregated into different sub-graphs. For instance, a first sub-graph may comprise vertices 501 and 502, and the link 591; a second sub-graph may comprise vertices 503, 502, and 505, and the links 592, 593, and 594; a third sub-graph may comprise vertices 506 and 507, and the link 596. In one example, the segregating involves clustering over the graph 540, e.g., as represented by the matrix 525. For instance, the clustering may comprise a community detection algorithm. For instance, "communities" may comprise sub-graphs where an external degree of each vertex does not exceed the internal degree. In one example, the community detection algorithm may comprise a spectral clustering, which is based on exploiting eigenvector structure in the matrix representation of the graph. In one example, the spectral clustering is based upon a community leading eigenvector community detection algorithm. The algorithm exploits the underlying graph structure and allows for the processing of weighted edges.

In one example, each of the sub-graphs in block 530 may comprise a candidate construction zone. For instance, in one example, construction zones are subject to one or more constraints, such as a requirement that a construction zone have no more than 10,000 living units, a requirement that a construction zone have no less than 8,000 living units, and so forth. Thus, if a sub-graph meets the one or more constraints, the sub-graph may be declared a construction zone. However, if a sub-graph does not meet the one or more constraints, then the sub-graph may be re-organized. In addition, a re-organization triggered by one sub-graph not meeting a constraint may affect another sub-graph, even if the other sub-graph does satisfy the one or more constraints. For example, if a sub-graph includes vertices representing distribution areas having a total (collective) number of living units less than a minimum, the process 500 may further include looking for a neighbor sub-graph to merge with, e.g., such that the resulting merged sub-graph includes more living units, but is still less than a maximum number of living units per construction zone. Possible merge strategies include: merging with a closest neighbor sub-graph that fulfills size constraint(s) for a construction zone; merging with a largest, closest neighbor; or merging with a smallest, closest neighbor. In one example, the foregoing is repeated until no more neighbors exist that meet the condition(s). In one example, if a sub-graph is too large, e.g., the sub-graph includes too many living units across all distribution areas represented by vertices in the sub-graph, the sub-graph may be broken up into smaller sub-graphs.

As stated above, a similar process to the process 500 may be followed with respect to creating marketing zones from construction zones. For instance, another graph may be created with vertices represent construction zones and edges representing adjacencies between construction zones. In one example, such a graph may also comprise a matrix with rows and columns representing the vertices, and non-zero entries representing adjacencies between construction zones (e.g., edges between the vertices representing the construction zones). However, in such an example, the similarity measures may be calculated based upon different factors, or distance scores. For instance, the distance scores may relate to similarities (or lack thereof) between different types of customer demographic information. The customer demographic information may comprise, for example, averages over living units within a construction zone or overall scores based upon living units within a construction zone relating to such things as: a percentage of living units subscribing to a "premium service," e.g., a non-basic cable package, a cloud-digital video recorder (DVR) storage service with a larger storage limit than a "basic" DVR service, etc., average household incomes, average number of family members per household (e.g., per living unit), average duration of credit card debt, and so forth.

In this regard, it should be further noted that the process 500 with respect to creating construction zones from distribution areas may be modified to account for different factors and/or additional factors. For instance, Equation 1 may be expanded or modified to include a factor relating to a percentage of rentals versus owner-occupied living units, a factor relating to a percentage of multi-dwelling units without long-term contracts, a factor relating to an average population density, a factor relating to whether distribution areas are within a same permitting zone (e.g., within a same jurisdiction, such as within a same town or county, etc.), and so forth. Thus, these and other modifications are all contemplated within the scope of the present disclosure.

Figure 6:
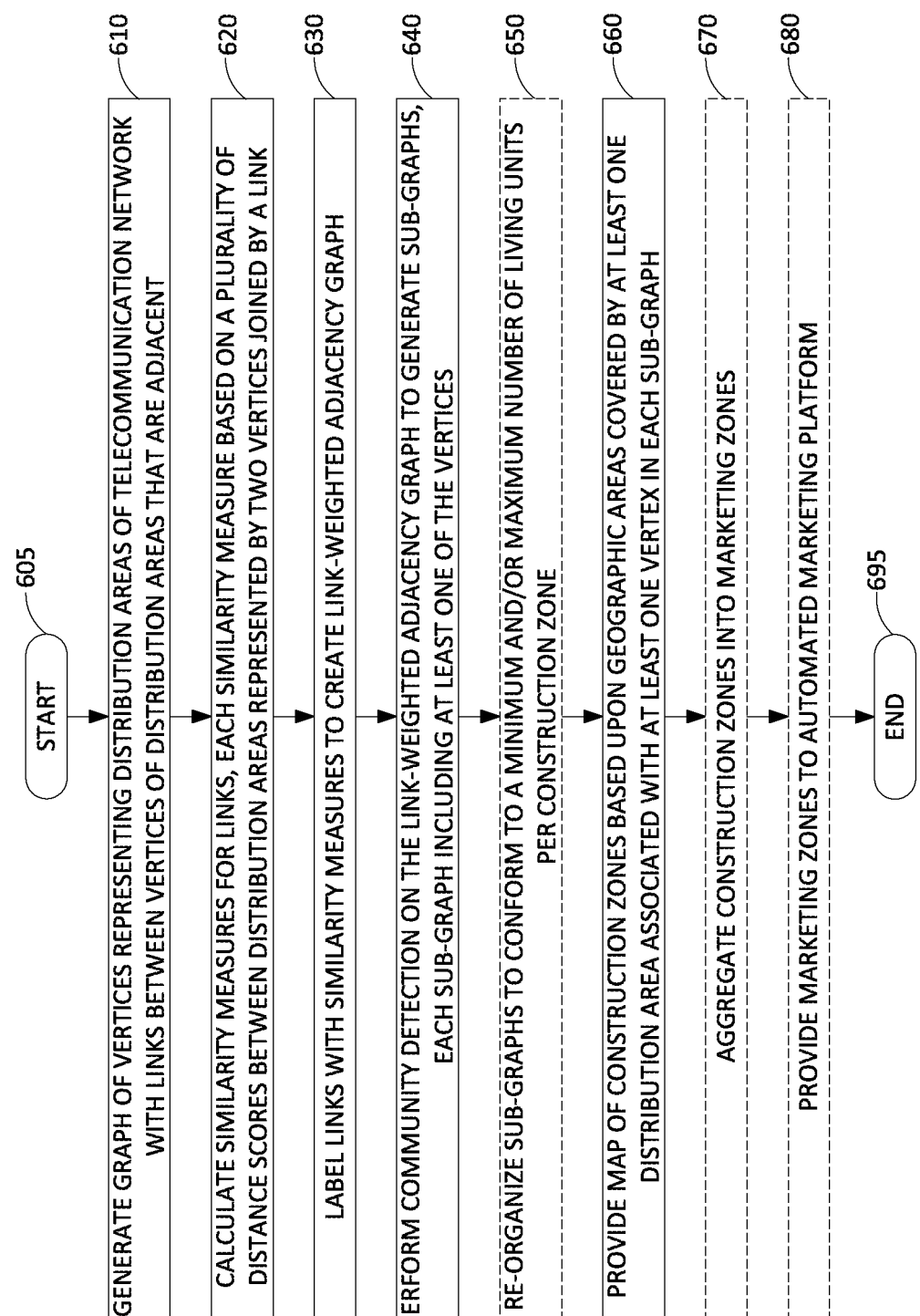
FIG. 6 illustrates a flowchart of an example method for generating construction zones based upon a link-weighted adjacency graph of distribution areas of a telecommunication network.

FIG. 6 illustrates an example flowchart of a method 600 for generating construction zones based upon a link-weighted adjacency graph of distribution areas of a telecommunication network. In one example, the steps, operations, or functions of the method 600 may be performed by any one or more of the components of the system 100 depicted in FIG. 1. For instance, in one example, the method 600 is performed by the application server 135, or by application server 135 in conjunction with other components of the system 100. Alternatively, or in addition, one or more steps, operations or functions of the method 600 may be implemented by a computing device having a processor, a memory and input/output devices as illustrated below in FIG. 7, specifically programmed to perform the steps, functions and/or operations of the method. Although any one of the elements in system 100 may be configured to perform various steps, operations or functions of the method 600, the method will now be described in terms of an example where steps or operations of the method are performed by a processor, such as processor 702 in FIG. 7.

The method 600 begins at step 605 and proceeds to step 610. At step 610, the processor generates a graph of a plurality of vertices and a plurality of links between the plurality of vertices, where the plurality of vertices represent distribution areas of a telecommunication network and where the plurality of links are included between vertices of distribution areas that are adjacent. In one example, the graph is generated based upon a geodatabase comprising a plurality of records for the plurality of distribution areas. In one example, the plurality of records comprises information regarding geographic boundaries of the plurality of distribution areas and routes associated with the plurality of distribution areas. In one example, links of the plurality of links between the plurality of vertices are determined by querying the geodatabase to determine adjacent distribution areas based upon distribution areas which share at least a portion of a geographic boundary. In one example, the plurality of vertices represent distribution areas of a same wire center of the telecommunication network. In other words, the processor may select records relating to distribution areas of a given wire center for performance of the method 600. In this regard, it should be noted that the method 600 may be repeated with respect to additional wire centers of the telecommunication network. In one example, and as described in greater detail below in connection with step 630, the graph may comprise a matrix of rows and columns representing the plurality of vertices, where at least a portion of row-column entries in the matrix represent the plurality of links.

At step 620, the processor calculates a plurality of similarity measures for the plurality of links. In one example, each similarity measure of the plurality of similarity measures is based upon a plurality of distance scores between two vertices of the plurality of vertices joined by one of the plurality of links relating to one of a plurality of factors. The plurality of factors may comprise, for example: percentages of aerial infrastructure of distribution areas represented by the two vertices, percentages of multi-unit buildings in the distribution areas represented by the two vertices, and whether or not the distribution areas represented by the two vertices are on a same route from a central office of the telecommunication network. In one example similarity measures may be calculated in the same or a similar manner as described above in connection with block 520 of the process 500 of FIG. 5.

At step 630, the processor labels the plurality of links with the plurality of similarity measures to create a link-weighted adjacency graph. As mentioned above in connection with step 610, in one example the graph may comprise a matrix of rows and columns representing the plurality of vertices, and at least a portion of row-column entries in the matrix represent the plurality of links. In addition, in one example, the labeling the plurality of links with the plurality of similarity measures to create the link-weighted adjacency graph at step 630 may include populating each row-column entry in the matrix for two vertices of the plurality of vertices joined by one of the plurality of links with a respective one of the plurality of similarity measures. In one example, row-column entries of the matrix for two vertices of the plurality of vertices that do not share a link may be set to a zero value.

At step 640, the processor performs a community detection on the link-weighted adjacency graph to generate a plurality of sub-graphs, each of the plurality of sub-graphs including at least one of the plurality of vertices. In one example, the community detection comprises a spectral clustering.

At optional step 650, the processor may re-organize the plurality of sub-graphs to conform to at least one of: a minimum number of living units per construction zone or a maximum number of living units per construction zone. In one example, the re-organizing comprises merging sub-graphs of the plurality of sub-graphs. In one example, the re-organizing may alternatively or additionally comprise splitting sub-graphs of the plurality of sub-graphs into additional sub-graphs that include a lesser number of living units. At the end of optional step 650, the sub-graphs that remain may define construction zones to be output by the method 600.

At step 660, the processor provides a map of construction zones based upon geographic areas covered by at least one distribution area of the plurality of distribution areas that is associated with the at least one of the plurality of vertices in each of the plurality of sub-graphs. In other words, the sub-graphs which remain after step 640 or after optional step 650 may be define the construction zones. In one example, step 660 may comprise forming construction zone polygons from the base polygons of the distribution areas represented by vertices within the respective sub-graphs, and overlaying the polygons on a geographic map.

Following step 660, the method 600 may proceed to optional step 670 or to step 695.

At optional step 670, the processor may aggregate the plurality of construction zones into a plurality of marketing zones. In one example, the aggregating the plurality of construction zones into the plurality of marketing zones may include performing an additional community detection on a second link-weighted adjacency graph. For instance, the second link-weighted adjacency graph may comprise a second plurality of vertices representing the plurality of construction zones and a second plurality of links between vertices of the second plurality of vertices representing adjacent construction zones. In one example, such a graph may also comprise a matrix with rows and columns representing the vertices, and non-zero entries representing adjacencies between construction zones (e.g., edges between the vertices representing the construction zones).

In greater detail, the aggregating the plurality of construction zones into the plurality of marketing zones may include the processor generating a second graph of a second plurality of vertices representing the plurality of construction zones and a second plurality of links between vertices representing construction zones that are adjacent. The processor may then calculate a second plurality of similarity measures for the second plurality of links. In one example, each similarity measure of the second plurality of similarity measures may be based upon a plurality of distance scores between two vertices of the second plurality of vertices joined by one of the second plurality of links relating to one of a plurality of factors. In one example, the plurality of factors comprises customer demographic information of customers associated with living units in construction zones represented by the two vertices of the second plurality of vertices. Next, the processor may label the second plurality of links with the second plurality of similarity measures to create a second link-weighted adjacency graph and perform a community detection on the second link-weighted adjacency graph to generate a second plurality of sub-graphs. In one example, each of the second plurality of sub-graphs includes at least one of the second plurality of vertices. In one example, the processor may also provide a map of the plurality of marketing zones based upon geographic areas covered by at least one construction zone of the plurality of construction zones that is associated with the at least one of the second plurality of vertices in each of second plurality of sub-graphs.

At optional step 680, the processor may provide the plurality of marketing zones to an automated marketing platform of the telecommunication network to provide automated marketing communications to subscribers associated with living units in the plurality of marketing zones. For example, the automated marketing platform may provide different automated marketing communications to subscribers associated with living units in different marketing zones.

At step 695, the method 600 ends.

It should be noted that the method 600 may be expanded to include additional steps, or to include modification or additions to the steps recited. For example, step 620 may be expanded to include additional factors relating to customer demographic data, or other factors. In addition, optional step 670 may be expanded to account for additional factors beyond customer demographic information, such as a factor quantifying an extent to which current infrastructure of a construction zone includes fiber between nodes and central offices versus copper/twisted pair, a level of capital expenditure of the telecommunication network within a construction zone within a last year, and so forth. It should also be noted that the method 600 may continue to be repeated, e.g., with respect to additional wire centers. In addition, in one example, the method 600 may be altered to comprise repeating steps 610 to 650, or steps 610 to 660 with respect to a plurality of wire centers in a designated marketing area (DMA), and then performing optional steps 670 and 680 with respect to the DMA.

In addition, although not specifically specified, one or more steps, functions or operations of the method 600 may include a storing, displaying and/or outputting step as required for a particular application. In other words, any data, records, fields, and/or intermediate results discussed in the method 600 can be stored, displayed and/or outputted either on the device executing the method 600, or to another device, as required for a particular application. Furthermore, steps, blocks, functions, or operations in FIG. 6 that recite a determining operation or involve a decision do not necessarily require that both branches of the determining operation be practiced. In other words, one of the branches of the determining operation can be deemed as an optional step. In addition, one or more steps, blocks, functions, or operations of the above described method 600 may comprise optional steps, or can be combined, separated, and/or performed in a different order from that described above, without departing from the examples of the present disclosure.

As such, the present disclosure provides at least one advancement in the technical field of telecommunication network operations. This advancement is in addition to the traditional methods of human personnel manually engaging in network planning. In particular, examples of the present disclosure automatically determine a set of construction zones which efficiently group distribution areas for network-build-out, e.g., for deploying FTTP infrastructure where it does not currently exist in the telecommunication network. This leads to more efficient operating of the telecommunication network, greater customer satisfaction, and better and more efficient use of human resources within an organization. In addition, marketing messages can be simplified insofar as DMA sub-groups are close in size. The present disclosure also provides a transformation of data, e.g., geographic data and other data characterizing distribution areas is generated and stored by one or more network components and/or centralized system components. In one example, the data regarding distribution areas is transformed into a graph, or similarity matrix, having vertices representing distribution areas and including links between vertices representing adjacencies between respective distribution areas. In addition, the graph is transformed into additional data or new data comprising a map of construction zones that may be used for efficient network-build out. Finally, examples of the present disclosure improve the functioning of a computing device, e.g., a server. Namely, a server deployed in the telecommunication service provider network is improved by the use of distribution area data, which is processed via the operations of the present disclosure to generate construction zones and marketing zones based upon link-weighted adjacency graphs.

Figure 7:
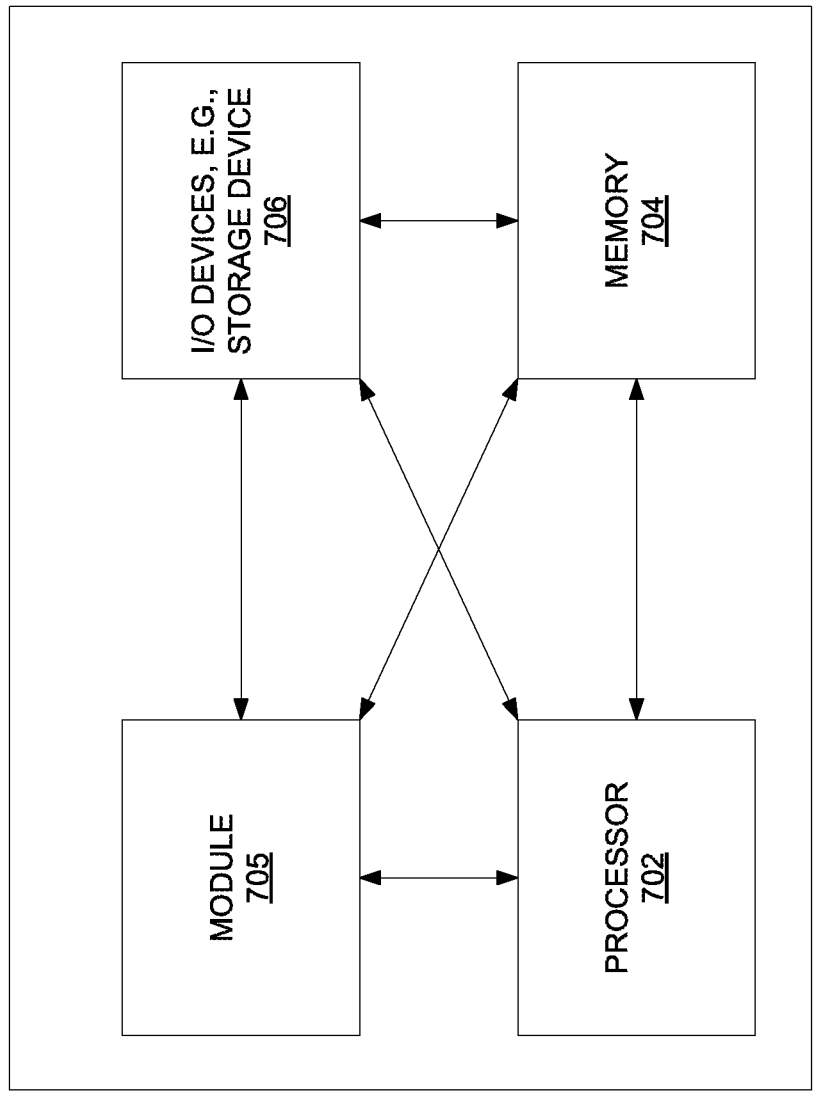
FIG. 7 illustrates a high-level block diagram of a computing device specially programmed to perform the functions described herein.

FIG. 7 depicts a high-level block diagram of a computing device specifically programmed to perform the functions described herein. As depicted in FIG. 7, the system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for generating construction zones based upon a link-weighted adjacency graph of distribution areas of a telecommunication network, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 600 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 702 can also be configured or programmed to cause other devices to perform one or more operations as discussed above. In other words, the one or more hardware processors 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 705 for generating construction zones based upon a link-weighted adjacency graph of distribution areas of a telecommunication network (e.g., a software program comprising computer-executable instructions) can be loaded into memory 704 and executed by hardware processor element 702 to implement the steps, functions or operations as discussed above in connection with the illustrative method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for generating construction zones based upon a link-weighted adjacency graph of distribution areas of a telecommunication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
   a processor; and
   a computer-readable storage medium storing instructions which, when executed by the processor, cause the processor to perform operations, the operations comprising:
      generating a graph of a plurality of vertices from a geodatabase comprising a plurality of records for a plurality of distribution areas of a telecommunication network, wherein each of the plurality of distribution areas comprises living units that are served from a same network node via a plurality of customer lines, each of the plurality of customer lines comprising aerial utility wiring or buried utility wiring, wherein the plurality of vertices represents the plurality of distribution areas of the telecommunication network, wherein the generating the graph comprises:
         querying the geodatabase to determine adjacent distribution areas based upon distribution areas which share at least a portion of a geographic boundary, in accordance with a query language of a geodatabase and query system associated with the geodatabase; and generating a plurality of links between the plurality of vertices, wherein the plurality of links is included in the graph between vertices of the adjacent distribution areas that are determined to be adjacent in accordance with the querying;

calculating a plurality of similarity measures for the plurality of links, wherein each similarity measure of the plurality of similarity measures is based upon a plurality of distance scores between two vertices of the plurality of vertices joined by one of the plurality of links relating to one of a plurality of factors, wherein the plurality of factors comprises: percentages of aerial utility wiring of distribution areas represented by the two vertices, percentages of multi-unit buildings in the distribution areas represented by the two vertices, and whether or not the distribution areas represented by the two vertices are on a same route from a central office of the telecommunication network;

labeling the plurality of links with the plurality of similarity measures to create a link-weighted adjacency graph;

performing a community detection on the link-weighted adjacency graph to generate a plurality of sub-graphs, wherein each of the plurality of sub-graphs includes at least one of the plurality of vertices; and providing a map of a plurality of construction zones based upon geographic areas covered by at least one distribution area of the plurality of distribution areas that is associated with the at least one of the plurality of vertices in each of the plurality of sub-graphs, wherein the providing the map comprises:

forming construction zone polygons for the plurality of construction zones from at least one base polygon of the at least one distribution area of the plurality of distribution areas represented by the at least one of the plurality of vertices in each of the plurality of sub-graphs; and overlaying the construction zone polygons on a geographic map.

2. The device of claim 1, wherein the plurality of records comprises information regarding:
   geographic boundaries of the plurality of distribution areas; and
   routes associated with the plurality of distribution areas.

3. The device of claim 1, wherein the graph comprises a matrix of rows and columns representing the plurality of vertices, wherein at least a portion of row-column entries in the matrix represents the plurality of links, wherein the labeling the plurality of links with the plurality of similarity measures to create the link-weighted adjacency graph comprises populating each row-column entry in the matrix for two vertices of the plurality of vertices joined by one of the plurality of links with a respective one of the plurality of similarity measures.

4. The device of claim 3, wherein row-column entries of the matrix for two vertices of the plurality of vertices that do not share a link are set to a zero value.

5. The device of claim 1, wherein the community detection comprises a spectral clustering.

6. The device of claim 1, wherein the plurality of vertices represents distribution areas of a same wire center of the telecommunication network.

7. The device of claim 1, wherein the operations further comprise:
   re-organizing the plurality of sub-graphs to conform to at least one of a minimum number of living units per construction zone or a maximum number of living units per construction zone.

8. The device of claim 7, wherein the re-organizing comprises merging sub-graphs of the plurality of sub-graphs.

9. The device of claim 7, wherein the re-organizing comprising splitting sub-graphs of the plurality of sub-graphs into additional sub-graphs that include a lesser number of living units.

10. The device of claim 1, wherein the operations further comprise:
    aggregating the plurality of construction zones into a plurality of marketing zones.

11. The device of claim 10, wherein the aggregating the plurality of construction zones into the plurality of marketing zones comprises:
    generating a second graph of a second plurality of vertices representing the plurality of construction zones and a second plurality of links between vertices of the second plurality of vertices representing construction zones of the plurality of construction zones that are adjacent;
    calculating a second plurality of similarity measures for the second plurality of links, wherein each similarity measure of the second plurality of similarity measures is based upon a plurality of distance scores between two vertices of the second plurality of vertices joined by one of the second plurality of links relating to one of a plurality of factors, wherein the plurality of factors comprises: customer demographic information of customers associated with living units in construction zones represented by the two vertices of the second plurality of vertices;
    labeling the second plurality of links with the second plurality of similarity measures to create a second link-weighted adjacency graph;
    performing a community detection on the second link-weighted adjacency graph to generate a second plurality of sub-graphs, wherein each of the second plurality of sub-graphs includes at least one of the second plurality of vertices; and
    providing a map of the plurality of marketing zones based upon geographic areas covered by at least one construction zone of the plurality of construction zones that is associated with the at least one of the second plurality of vertices in each of second plurality of sub-graphs.

12. The device of claim 11, wherein at least one of the plurality of distance scores is based upon smoothed aggregate values for the customer demographics information.

13. The device of claim 10, wherein the aggregating the plurality of construction zones into the plurality of marketing zones comprises:
    performing an additional community detection on a second link-weighted adjacency graph comprising a second plurality of vertices representing the plurality of construction zones and a second plurality of links between vertices of the second plurality of vertices representing adjacent construction zones.

14. The device of claim 13, wherein the operations further comprise:
    providing the plurality of marketing zones to an automated marketing platform of the telecommunication network to provide automated marketing communications to subscribers associated with living units in the plurality of marketing zones.

15. A method comprising:
generating, by a processor, a graph of a plurality of vertices from a geodatabase comprising a plurality of records for a plurality of distribution areas of a telecommunication network, wherein each of the plurality of distribution areas comprises living units that are served from a same network node via a plurality of customer lines, each of the plurality of customer lines comprising aerial utility wiring or buried utility wiring, wherein the plurality of vertices represents the plurality of distribution areas of the telecommunication network, wherein the generating the graph comprises:
  querying the geodatabase to determine adjacent distribution areas based upon distribution areas which share at least a portion of a geographic boundary, in accordance with a query language of a geodatabase and query system associated with the geodatabase; and
  generating a plurality of links between the plurality of vertices, wherein the plurality of links is included in the graph between vertices of the adjacent distribution areas that are determined to be adjacent in accordance with the querying;
calculating, by the processor, a plurality of similarity measures for the plurality of links, wherein each similarity measure of the plurality of similarity measures is based upon a plurality of distance scores between two vertices of the plurality of vertices joined by one of the plurality of links relating to one of a plurality of factors, wherein the plurality of factors comprises: percentages of aerial utility wiring of distribution areas represented by the two vertices, percentages of multi-unit buildings in the distribution areas represented by the two vertices, and whether or not the distribution areas represented by the two vertices are on a same route from a central office of the telecommunication network;
labeling, by the processor, the plurality of links with the plurality of similarity measures to create a link-weighted adjacency graph;
performing, by the processor, a community detection on the link-weighted adjacency graph to generate a plurality of sub-graphs, wherein each of the plurality of sub-graphs includes at least one of the plurality of vertices; and
providing, by the processor, a map of a plurality of construction zones based upon geographic areas covered by at least one distribution area of the plurality of distribution areas that is associated with the at least one of the plurality of vertices in each of the plurality of sub-graphs, wherein the providing the map comprises:
  forming construction zone polygons for the plurality of construction zones from at least one base polygon of the at least one distribution area of the plurality of distribution areas represented by the at least one of the plurality of vertices in each of the plurality of sub-graphs; and
  overlaying the construction zone polygons on a geographic map.

16. The method of claim 15, wherein the graph comprises a matrix of rows and columns representing the plurality of vertices, wherein at least a portion of row-column entries in the matrix represents the plurality of links, wherein the labeling the plurality of links with the plurality of similarity measures to create the link-weighted adjacency graph comprises populating each row-column entry in the matrix for two vertices of the plurality of vertices joined by one of the plurality of links with a respective one of the plurality of similarity measures.

17. The method of claim 15, further comprising:
aggregating the plurality of construction zones into a plurality of marketing zones, wherein the aggregating the plurality of construction zones into the plurality of marketing zones comprises:
performing an additional community detection on a second link-weighted adjacency graph comprising a second plurality of vertices representing the plurality of construction zones and a second plurality of links between vertices of the second plurality of vertices representing adjacent construction zones.

18. A non-transitory computer-readable storage medium storing instructions which, when executed by a processor of a telecommunication service provider network, cause the processor to perform operations, the operations comprising:
generating a graph of a plurality of vertices from a geodatabase comprising a plurality of records for a plurality of distribution areas of a telecommunication network, wherein each of the plurality of distribution areas comprises living units that are served from a same network node via a plurality of customer lines, each of the plurality of customer lines comprising aerial utility wiring or buried utility wiring, wherein the plurality of vertices represents the plurality of distribution areas of the telecommunication network, wherein the generating the graph comprises:
  querying the geodatabase to determine adjacent distribution areas based upon distribution areas which share at least a portion of a geographic boundary, in accordance with a query language of a geodatabase and query system associated with the geodatabase; and
  generating a plurality of links between the plurality of vertices, wherein the plurality of links is included in the graph between vertices of the adjacent distribution areas that are determined to be adjacent in accordance with the querying;
calculating a plurality of similarity measures for the plurality of links, wherein each similarity measure of the plurality of similarity measures comprises a weighted sum of similarity scores between two vertices of the plurality of vertices joined by one of the plurality of links relating to one of a plurality of factors, wherein the plurality of factors comprises: percentages of aerial utility wiring of distribution areas represented by the two vertices, percentages of multi-unit buildings in the distribution areas represented by the two vertices, and whether or not the distribution areas represented by the two vertices are on a same route from a central office of the telecommunication network;
labeling the plurality of links with the plurality of similarity measures to generate a link-weighted adjacency graph;
performing a community detection on the link-weighted adjacency graph to generate a plurality of sub-graphs, wherein each of the plurality of sub-graphs includes at least one of the plurality of vertices; and
providing a map of a plurality of construction zones based upon geographic areas covered by at least one distribution area of the plurality of distribution areas that is associated with the at least one of the plurality of vertices in each of the plurality of sub-graphs, wherein the providing the map comprises:

forming construction zone polygons for the plurality of construction zones from at least one base polygon of the at least one distribution area of the plurality of distribution areas represented by the at least one of the plurality of vertices in each of the plurality of sub-graphs; and overlaying the construction zone polygons on a geographic map.

19. The non-transitory computer-readable storage medium of claim 18, wherein the plurality of records comprises information regarding:

geographic boundaries of the plurality of distribution areas; and routes associated with the plurality of distribution areas.

* * * * *